US011395183B2

United States Patent
Tomeba et al.

(10) Patent No.: US 11,395,183 B2
(45) Date of Patent: **\*Jul. 19, 2022**

(54) RADIO RECEIVING APPARATUS, RADIO TRANSMISSION APPARATUS, AND COMMUNICATION METHOD

(71) Applicant: SHARP KABUSHIKI KAISHA, Sakai (JP)

(72) Inventors: Hiromichi Tomeba, Sakai (JP); Tomoki Yoshimura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,519

(22) Filed: Nov. 20, 2020

(65) Prior Publication Data

US 2021/0076256 A1    Mar. 11, 2021

Related U.S. Application Data

(62) Division of application No. 15/557,061, filed as application No. PCT/JP2016/057500 on Mar. 10, 2016, now Pat. No. 10,856,178.

(30) Foreign Application Priority Data

Mar. 11, 2015    (JP) ................. 2015-047811

(51) Int. Cl.
   *H04W 28/06*    (2009.01)
   *H04W 84/12*    (2009.01)
   (Continued)

(52) U.S. Cl.
   CPC ........... *H04W 28/06* (2013.01); *H04L 5/0037* (2013.01); *H04L 5/0053* (2013.01);
   (Continued)

(58) Field of Classification Search
   CPC . H04W 28/06; H04W 72/1263; H04W 84/12; H04W 84/0816; H04W 76/10;
   (Continued)

(56) References Cited

U.S. PATENT DOCUMENTS

8,374,130 B2    2/2013 Hassan et al.
9,363,795 B2    6/2016 Hassan et al.
(Continued)

FOREIGN PATENT DOCUMENTS

| JP | 2011-510597 A | 3/2011 |
| JP | 2012-104874 A | 5/2012 |
| WO | 2014/014094 A1 | 1/2014 |

OTHER PUBLICATIONS

Koichi Ishihara et al., "Simultaneous transmission technologies for HEW", IEEE 11-13/1395r2, Nov. 2013.
(Continued)

*Primary Examiner* — Robert C Scheibel
(74) *Attorney, Agent, or Firm* — ScienBiziP, P.C.

(57) ABSTRACT

Provided are a radio transmission apparatus, a radio receiving apparatus, a radio communication system, and a communication method that make it possible for the radio transmission apparatus performing OFDMA transmission to highly efficiently determine a radio receiving apparatus that is caused to participate in the OFDMA transmission. The radio transmission apparatus that performs OFDMA transmission with a plurality of radio receiving apparatuses includes a reception unit that has a function of performing carrier sense and a function of receiving a function information response frame including function response information indicating that a function of performing the OFDMA transmission is included, and a transmission unit that has a (Continued)

function of switching whether or not to transmit a frame to at least one of the plurality of radio receiving apparatuses on a basis of the carrier sense.

3 Claims, 9 Drawing Sheets

(51) Int. Cl.
*H04L 5/00* (2006.01)
*H04W 72/12* (2009.01)
*H04W 76/10* (2018.01)
*H04W 76/28* (2018.01)
*H04W 74/08* (2009.01)
*H04W 74/00* (2009.01)

(52) U.S. Cl.
CPC ... *H04W 72/1263* (2013.01); *H04W 74/0816* (2013.01); *H04W 76/10* (2018.02); *H04W 76/28* (2018.02); *H04W 84/12* (2013.01); *H04L 5/0007* (2013.01); *H04W 74/006* (2013.01)

(58) Field of Classification Search
CPC ............. H04W 76/28; H04W 74/0816; H04W 74/006; H04L 5/0037; H04L 5/0053; H04L 5/0007
See application file for complete search history.

(56) References Cited

U.S. PATENT DOCUMENTS

| | | |
|---|---|---|
| 2009/0190535 A1* | 7/2009 | Hassan ................. H04L 5/0007 370/329 |
| 2013/0039285 A1 | 2/2013 | Sorrentino |
| 2013/0155980 A1 | 6/2013 | Hassan et al. |
| 2015/0117363 A1* | 4/2015 | Rong .................. H04L 27/2607 370/329 |
| 2015/0172012 A1 | 6/2015 | Abeysekera et al. |
| 2016/0149743 A1* | 5/2016 | Rong .................. H04B 7/0452 370/329 |
| 2016/0173243 A1 | 6/2016 | Hassan et al. |
| 2017/0288748 A1* | 10/2017 | Lou ...................... H04B 7/0452 |

OTHER PUBLICATIONS

Office Action issued on U.S. Appl. No. 15/557,061 dated Aug. 10, 2018.
Office Action issued on U.S. Appl. No. 15/557,061 dated Apr. 2, 2019.
Office Action issued on U.S. Appl. No. 15/557,061 dated Dec. 20, 2019.

* cited by examiner

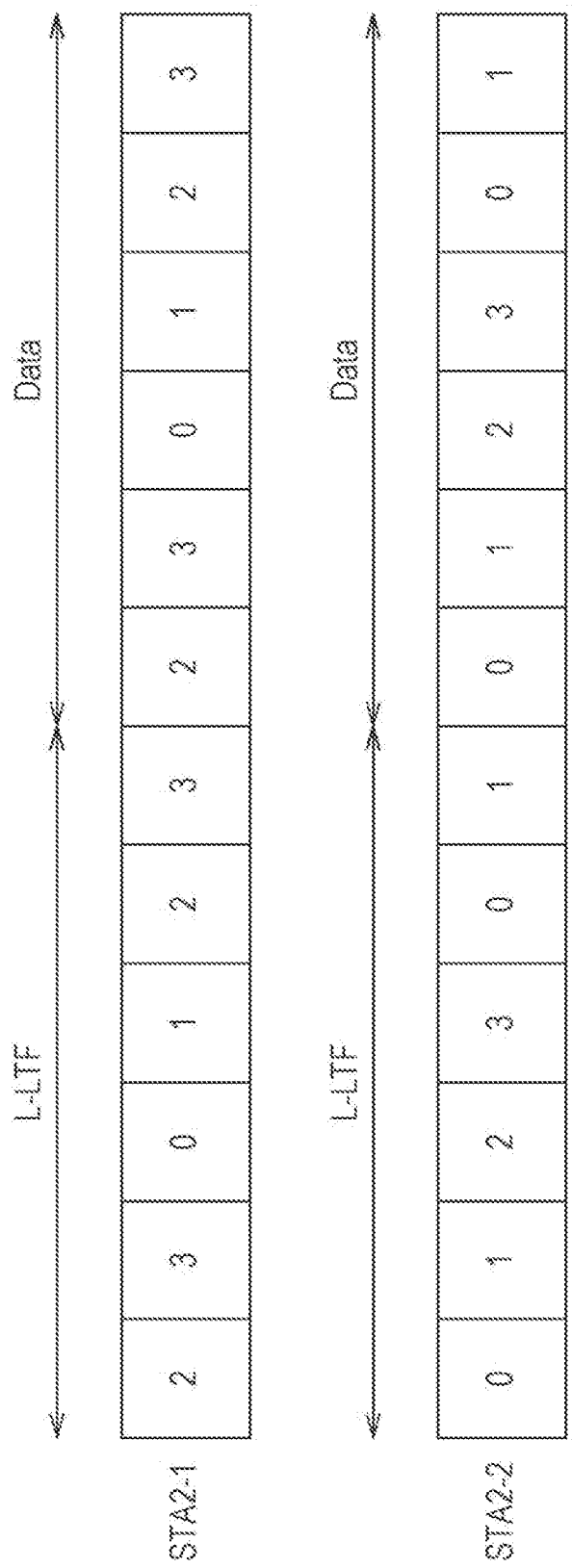

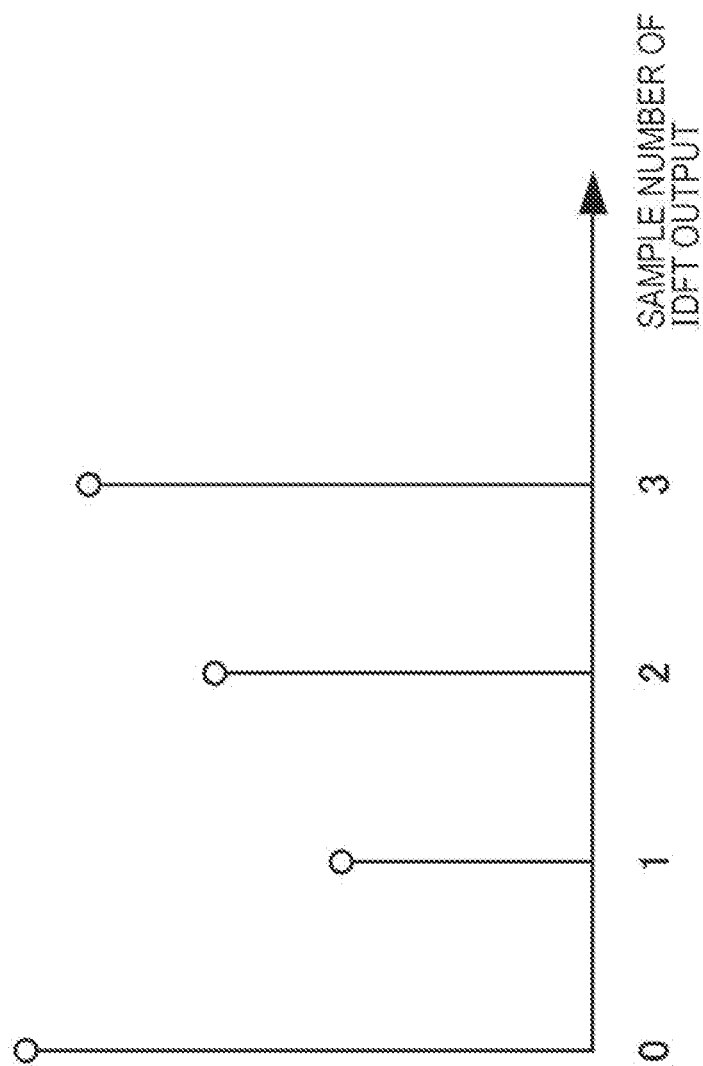

RADIO RECEIVING APPARATUS, RADIO TRANSMISSION APPARATUS, AND COMMUNICATION METHOD

TECHNICAL FIELD

The present invention relates to a radio receiving apparatus, a radio transmission apparatus, and a communication method.

BACKGROUND ART

As an advanced standard of IEEE802.11n which is a radio LAN (Local area network) standard that has been widely put into use, the IEEE802.11ac standard has been developed by the IEEE (The Institute of Electrical and Electronics Engineers, Inc.). Currently, standardization efforts for IEEE802.11ax are conducted as a successive standard of IEEE802.11n/ac. In the current radio LAN system, interference due to an increase in the number of terminals per unit area is becoming a large problem, and such a congested environment needs to be considered in an IEEE802.11ax standard. On the other hand, differently from the previous radio LAN standards, not only improvement of peak throughput but also improvement of user throughput are cited as main required conditions in the IEEE802.11ax standard. It is essential to introduce a highly efficient simultaneous multiplexing transmission scheme (access scheme) in order to improve the user throughput.

In standards before the IEEE802.11n standard, an access scheme of an autonomous distributed control type called CSMA/CA (Carrier sense multiple access with collision avoidance) has been adopted as the access scheme. In IEEE802.11ac, space division multiple access (SDMA) by a multi-user multiple-input multiple-output (MU-MIMO) technique is newly added.

The IEEE802.11ax standard is required to further improve the access scheme for improving the user throughput. As the highly efficient access scheme, there is Orthogonal Frequency Division Multiple Access (OFDMA). The OFDMA is a scheme for, by using characteristics of Orthogonal Frequency Division Multiplexing (OFDM) which allows enhancement of frequency efficiency by arranging a large number of orthogonal sub-carriers densely at intervals of a reciprocal of a signal duration, allocating any number of sub-carriers (or a frequency band composed of a group of contiguous sub-carriers) with good characteristics to each of radio receiving apparatuses in accordance with reception characteristics different in each of radio receiving apparatuses in a multipath environment, and thereby further increasing substantial frequency efficiency. It is expected that the user throughput is improved by introducing the OFDMA to the IEEE802.11ax standard (NPL 1).

In order for a radio transmission apparatus to arrange a data signal addressed to each of radio receiving apparatuses in a suitable sub-carrier, the radio transmission apparatus needs to acquire reception characteristics between the radio transmission apparatus and the radio receiving apparatus with high accuracy. For example, radio measurement procedures in which a radio transmission apparatus requests a radio receiving apparatus to measure reception characteristics of the radio receiving apparatus and report a result of the measurement are specified in the IEEE802.11 standard. By performing the radio measurement procedures with radio receiving apparatuses, the radio transmission apparatus is able to grasp reception characteristics of the radio receiving apparatuses. However, the radio measurement procedures need to be performed in accordance with a mechanism of the CSMA/CA. Thus, in a case where the radio transmission apparatus performs OFDMA transmission with a plurality of radio receiving apparatuses, a large amount of radio resources are allocated for the radio measurement procedures, resulting in limitation of improvement of throughput of the OFDMA transmission.

CITATION LIST

Non Patent Literature

NPL 1: IEEE 11-13/1395r2, "Simultaneous transmission technologies for HEW", November 2013.

SUMMARY OF INVENTION

Technical Problem

In order for a radio transmission apparatus to arrange a data signal addressed to each of radio receiving apparatuses in a suitable sub-carrier, the radio transmission apparatus needs to correctly grasp reception characteristics of the radio receiving apparatus. In a communication system which is premised on CSMA/CA, however, a large amount of radio resources are required to correctly grasp the reception characteristics, so that improvement of throughput of the OFDMA transmission is limited.

The invention was made in view of such circumstances and an object thereof is to provide a radio transmission apparatus, a radio receiving apparatus, a radio communication system, and a communication method that make it possible for a radio transmission apparatus performing OFDMA transmission to highly efficiently determine a radio receiving apparatus that is caused to participate in the OFDMA transmission.

Solution to Problem

A radio transmission apparatus, a radio receiving apparatus, a communication system, and a communication method according to the invention for solving the aforementioned problems are as follows.

(1) That is, a radio transmission apparatus of the invention is a radio transmission apparatus that performs multi-user transmission with a plurality of radio receiving apparatuses, and the radio transmission apparatus includes a transmission unit that has a function of generating a function information frame including function information indicating that a function of performing the multi-user transmission is included and that has a function of transmitting the function information frame.

(2) The radio transmission apparatus of the invention is the radio transmission apparatus according to (1) above that includes a reception unit that has a function of receiving a function information response frame which is transmitted by each of the radio receiving apparatuses and which includes function response information indicating that a function of performing the multi-user transmission is included.

(3) The radio transmission apparatus of the invention is the radio transmission apparatus according to (2) above, in which a combination of the radio receiving apparatuses that are caused to participate in the multi-user transmission is decided on a basis of the function response information.

(4) The radio transmission apparatus of the invention is the radio transmission apparatus according to (1) above, in which the transmission unit has a function of transmitting a resource reserving frame and a function of transmitting a signal frame that includes information indicating a cyclic shift amount given by the radio receiving apparatus to a resource reserving response frame corresponding to the resource reserving frame transmitted by the radio receiving apparatus, and the radio transmission apparatus has a reception unit that has a function of receiving the resource reserving response frame is included.

(5) A radio receiving apparatus of the invention is a radio receiving apparatus performing communication with a radio transmission apparatus that performs multi-user transmission with a plurality of radio receiving apparatuses, and the radio receiving apparatus includes a reception unit that has a function of receiving a function information frame including function information indicating that the radio transmission apparatus has a function of performing the multi-user transmission and a transmission unit that has a function of generating a function information response frame including function response information indicating that the radio receiving apparatus has a function of participating in the multi-user transmission and that has a function of transmitting the function information response frame.

(6) The radio receiving apparatus of the invention is the radio receiving apparatus according to (5) above, in which the reception unit has a function of receiving a resource reserving frame transmitted by the radio transmission apparatus, and the transmission unit has a function of generating a resource reserving response frame corresponding to the resource reserving frame and a function of giving a cyclic shift to the resource reserving response frame.

(7) The radio receiving apparatus of the invention is the radio receiving apparatus according to (6) above, in which the transmission unit has a function of transmitting the resource reserving frame to a first radio resource and a second radio resource, and a cyclic shift amount of phase shift given to the resource reserving frame transmitted by the first radio resource is different from a cyclic shift amount of phase shift given to the resource reserving frame transmitted by the second radio resource.

(8) The radio receiving apparatus of the invention is the radio receiving apparatus according to (6) or (7) above, in which the cyclic shift amount of cyclic shift given to the resource reserving response frame by the transmission unit is signaled by the radio transmission apparatus.

(9) A communication method of the invention is a communication method of a radio transmission apparatus that performs multi-user transmission with a plurality of radio receiving apparatuses, and the communication method includes the steps of: generating a function information frame including function information indicating that a function of performing the multi-user transmission is included; and transmitting the function information frame.

(10) A communication method of the invention is a communication method of a radio receiving apparatus performing communication with a radio transmission apparatus that performs multi-user transmission with a plurality of radio receiving apparatuses, and the communication method includes the steps of: receiving a function information frame including function information indicating that the radio transmission apparatus has a function of performing the multi-user transmission; generating a function information response frame including function response information indicating that the radio receiving apparatus has a function of participating in the multi-user transmission; and transmitting the function information response frame.

(11) A communication system of the invention is a communication system that includes a radio transmission apparatus and a plurality of radio receiving apparatuses, in which the radio transmission apparatus has a transmission unit that has a function of generating a function information frame including function information indicating that a function of performing the multi-user transmission is included and that has a function of transmitting the function information frame, and each of the radio receiving apparatuses has a reception unit that has a function of receiving the function information frame and a transmission unit that has a function of generating a function information response frame including function response information indicating that the radio receiving apparatus has a function of participating in the multi-user transmission and that has a function of transmitting the function information response frame.

Advantageous Effects of Invention

According to the invention, since a radio transmission apparatus performing OFDMA transmission is able to highly efficiently determine a radio receiving apparatus that is caused to participate in the OFDMA transmission, overhead associated with the OFDMA transmission is able to be significantly reduced, thus making it possible to greatly improve user throughput.

BRIEF DESCRIPTION OF DRAWINGS

FIG. 8 illustrates a configuration example of a frame configuration of a signal of the invention.

FIG. 9 illustrates an example of a signal processing output of the invention.

DESCRIPTION OF EMBODIMENTS

1. First Embodiment

Figure 1:
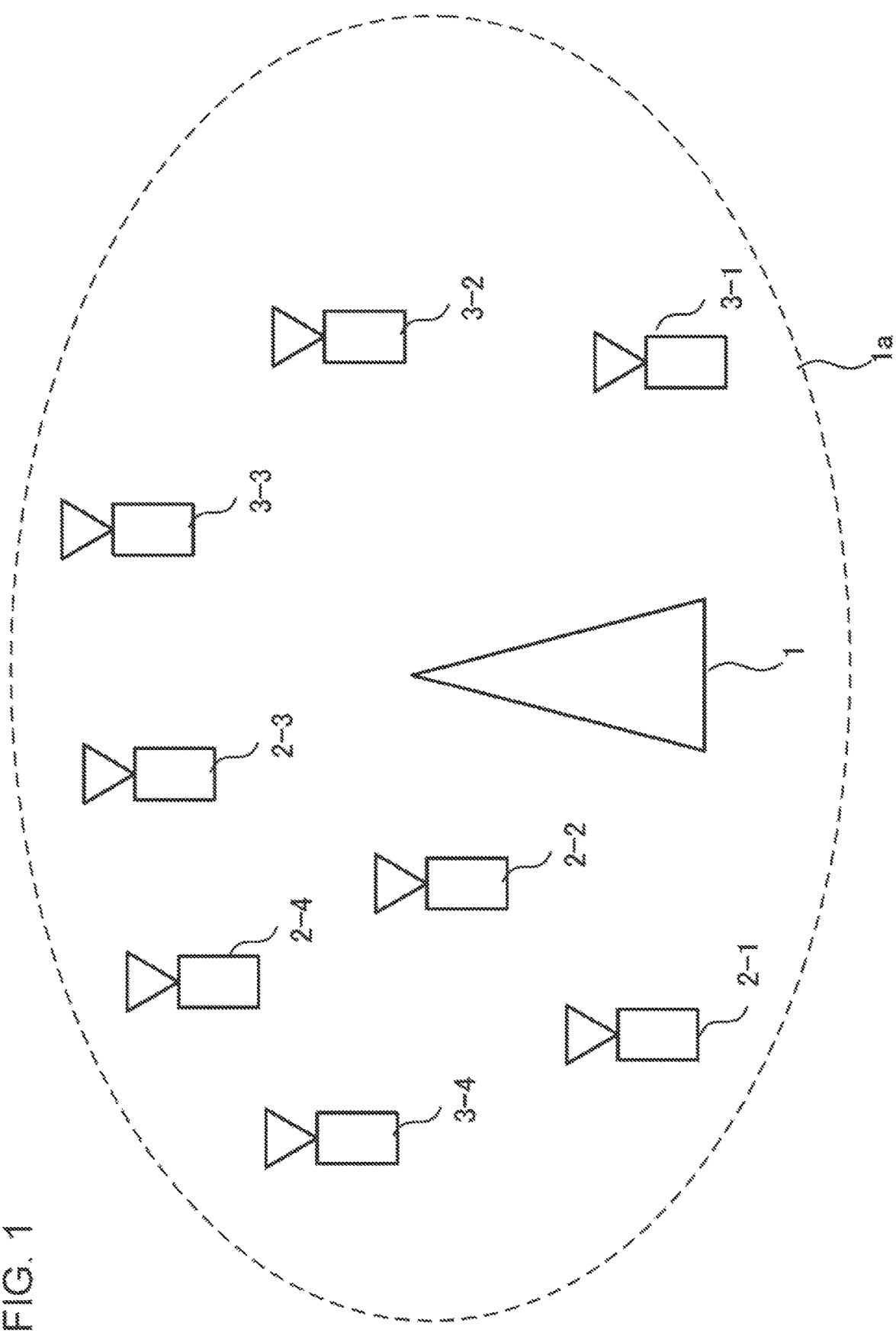
FIG. 1 illustrates an example of a communication system according to the invention.

A communication system in the present embodiment includes a radio transmission apparatus (access point (AP)) and a plurality of radio receiving apparatuses (stations (STAs)). A network composed of the AP and the STAs is called a basic service set (BSS).

The AP and the STAs in the BSS perform communication on the basis of CSMA/CA (Carrier sense multiple access with collision avoidance). Though the present embodiment is intended for an infrastructure mode in which the AP performs communication with a plurality of STAs, a method of the present embodiment may be carried out also in an ad hoc mode in which STAs directly perform communication with each other.

In an IEEE802.11 system, apparatuses are able to transmit transmission frames of a plurality of frame types having a common frame format. The transmission frames are defined by a physical (PHY) layer, a medium access control (MAC) layer, and a logical link control (LLC) layer.

The transmission frame of the PHY layer is called a physical protocol data unit (PHY protocol data unit: PPDU). The PPDU is constituted by a physical layer header (PHY header) including, for example, header information for performing signal processing in the physical layer, a physical service data unit (PHY service data unit: PSDU) that is a data unit processed in the physical layer, and the like. The PSDU is able to be constituted by an aggregated MPDU (A-MPDU) in which a plurality of MAC protocol data units (MPDUs) each of which serves as a retransmission unit in a radio section are aggregated.

The PHY header includes reference signals of, for example, a short training field (STF) used for signal detection, synchronization, and the like and a long training field (LTF) used for acquiring channel information for data demodulation, and control signals such as signals (SIGs) in which control information for data demodulation is included. The STF is classified in accordance with a corresponding standard into a legacy-STF (L-STF), a high throughput-STF (HT-STF), a very high throughput-STF (VHT-STF), and the like, and the LTF and the SIG are classified similarly into an L-LTF, an HT-LTF and a VHT-LTF, and an L-SIG, an HT-SIG and a VHT-SIG. The VHT-SIG is further classified into a VHT-SIG-A and a VHT-SIG-B.

The PPDU is modulated in accordance with a corresponding standard. For example, in the case of an IEEE802.11n standard, the PPDU is modulated to an orthogonal frequency division multiplexing (OFDM) signal.

The MPDU is constituted by a MAC layer header (MAC header) in which, for example, header information for performing signal processing in the MAC layer is included, a MAC service data unit (MSDU) that is a data unit processed in the MAC layer, or a frame body, and a frame check sequence (FCS) for checking whether or not there is an error in a frame. A plurality of MSDUs are also able to be aggregated as an aggregated MSDU (A-MSDU).

The frame type of the transmission frame of the MAC layer is roughly classified into three data frames of a management frame in which, for example, a connection state between apparatuses is managed, a control frame in which a communication state between apparatuses is managed, and a data frame including actual transmission data, and each of the frames is further classified into a plurality of kinds of sub-frame types. The control frame includes a reception completion notification (Acknowledge: ACK) frame, a transmission request (Request to send: RTS) frame, a reception preparation completion (Clear to send: CTS) frame, and the like. The management frame includes a beacon frame, a probe request frame, a probe response frame, an authentication frame, a connection request (association request) frame, a connection response (association response) frame, and the like. The data frame includes a data frame, a polling (CF-poll) frame, and the like. Each apparatus is able to grasp a frame type and a sub-frame type of a received frame by reading content of a frame control field included in a MAC header.

The beacon frame includes an interval (Beacon interval) at which beacon is transmitted and a field in which information (Service set identifier (SSID) or the like) for identifying an AP is described. The AP is able to periodically broadcast a beacon frame into a BSS and an STA is able to grasp the AP around the STA by receiving the beacon frame. Grasping of the AP by the STA based on a signal that is broadcasted from the AP is referred to as passive scanning. On the other hand, probing of the AP by broadcasting a probe request frame into the BSS by the STA is referred to as active scanning. The AP is able to transmit a probe response frame as a response to the probe request frame and description content of the probe response frame is equivalent to that of the beacon frame.

The STA recognizes the AP and then performs connection processing for the AP. The connection processing is classified into an authentication procedure and a connection (association) procedure. The STA transmits an authentication frame to the AP that desires connection. Upon reception of the authentication frame, the AP transmits, to the STA, an authentication frame including a status code indicating, for example, whether or not to authenticate the STA. By reading the status code described in the authentication frame, the STA is able to determine whether or not authentication for the STA is allowed by the AP. Note that, the AP and the STA are able to exchange an authentication frame a plurality of times.

Subsequently to the authentication procedure, the STA transmits a connection request frame to the AP to perform the connection procedure. Upon reception of the connection request frame, the AP determines whether or not to allow connection of the STA and transmits a connection response frame to notify whether or not to allow the connection. In addition to the status code indicating whether or not connection processing is allowed, an association identification number (Association identifier: AID) for identifying the STA is described in the connection response frame. The AP is able to manage a plurality of STAs by setting different AIDs to the STAs that have been allowed to make connection.

After the connection processing is performed, the AP and the STA perform actual data transmission. In the IEEE802.11 system, a distributed coordination function (DCF), a point coordination function (PCF), an extended function thereof (such as a hybrid coordination function: HCF), and the like are defined. Description will be given below by taking a case where the AP transmits a signal to the STA by the DCF as an example.

In the DCF, prior to communication, the AP and the STA perform carrier sense (CS) for checking a usage state of a radio channel around the AP and the STA. For example, in a case where the AP serving as a transmission station receives, by the radio channel, a signal having a level higher than a clear channel assessment level (CCA level) that is defined in advance, the AP postpones transmission of a transmission frame by the radio channel to enter into a reception operation. Hereinafter, in the radio channel, a state in which a signal having a level equal to or greater than the CCA level is detected is referred to as a busy state and a state in which a signal having a level equal to or greater than the CCA level is not detected is referred to as an idle state. The CS performed by each apparatus on the basis of power of an actually received signal in this manner is called physical carrier sense (physical CS). Note that, the CCA level is also referred to as a carrier sense level (CS level) or a CCA threshold (CCAT). Note that, when detecting a signal having a level equal to or greater than the CCA level, the AP and the STA enter into an operation of demodulating at least a signal of the PHY layer.

The AP performs carrier sense during a frame interval (Inter frame space: IFS) according to a type of the transmission frame to be transmitted and determines whether the radio channel is in the busy state or the idle state. A time period in which the AP performs the carrier sense varies in accordance with a frame type and a sub-frame type of the transmission frame to be transmitted by the AP. In the IEEE802.11 system, a plurality of IFSs having different time periods are defined, and there are a short frame interval (Short IFS: SIFS) used for a transmission frame to which highest priority is given, a polling frame interval (PCF IFS: PIFS) used for a transmission frame having relatively high priority, a distributed control frame interval (DCF IFS: DIFS) used for a transmission frame having lowest priority, and the like. When the AP transmits a data frame by the DCF, the AP uses the DIFS.

The AP waits for the DIFS and then further waits for a random back-off time for preventing frame collision. The random back-off time called contention window (CW) is used in the IEEE802.11 system. In the CSMA/CA, it is premised that a transmission frame transmitted by a certain transmission station is received by a reception station in a state where there is no interference from other transmission stations. Therefore, when transmission frames are transmitted by transmission stations at the same timing, the frames collide with each other so that the reception station is not able to receive the transmission frames correctly. Thus, when each of the transmission stations waits for a time that is set randomly before starting the transmission, the frame collision is prevented. When determining that the radio channel is in the idle state by the carrier sense, the AP starts countdown of the CW, acquires a transmission right only when the CW indicates 0, and is allowed to transmit a data frame to the STA. Note that, in a case where the AP determines that the radio channel is in the busy state by the carrier sense during countdown of the CW, the AP stops countdown of the CW. In a case where the radio channel is brought into the idle state, the AP restarts countdown of the remaining CW subsequently to the previous IFS.

The STA serving as a reception station receives a transmission frame, reads a PHY header of the transmission frame, and demodulates the received transmission frame. By reading a MAC header of a demodulated signal, the STA is able to recognize whether or not the transmission frame is addressed to the STA. Note that, the STA is also able to determine an address of the transmission frame on the basis of information (for example, a group identification number (Group identifier: Group ID) described in the VHT-SIG-A) described in the PHY header.

When the STA determines that the received transmission frame is addressed to the STA and the transmission frame is demodulated without error, the STA needs to transmit, to the AP serving as the transmission station, an ACK frame indicating that the frame is able to be received correctly. The ACK frame is one of transmission frames that are transmitted only by waiting for the time period of the SIFS (without taking the random back-off time) and that have highest priority. Upon reception of the ACK frame transmitted from the STA, the AP ends a series of communication. Note that, when the STA is not able to receive the frame correctly, the STA does not transmit the ACK. Thus, when the AP has not received the ACK frame from the reception station for a fixed time period (length of SIFS+ACK frame) after the frame transmission, it is considered that communication has failed and the communication ends. In this manner, the end of one communication (also referred to as burst) of the IEEE802.11 system is always determined on the basis of whether or not the ACK frame is received except for special cases such as a case where a broadcast signal such as a beacon frame is transmitted and a case where fragmentation for fragment of transmission data is used.

When determining that the received transmission frame is not addressed to the STA, the STA sets a network allocation vector (NAV) on the basis of a length of the transmission frame described in the PHY header or the like. The STA does not attempt to perform communication during a time period that is set to the NAV. That is, since the STA performs, during the time period that is set to the NAV, the same operation as the operation performed when it is determined that the radio channel is in the busy state by the physical CS, communication control by the NAV is also called virtual carrier sense (virtual CS). The NAV is set not only on the basis of information described in the PHY header, but also by a transmission request (Request to send: RTS) frame or a reception preparation completion (Clear to send: CTS) frame that is introduced to solve a hidden node problem. The frame of the MAC layer of the RTS frame or the CTS frame includes a receiver address field indicating an address of the frame and a duration field indicating a time period of the NAV. A terminal apparatus that transmits the RTS frame or the CTS frame is able to describe, in the duration field, a time period during which a radio resource is to be occupied. The terminal apparatus that has received the RTS frame sets the NAV by a length described in the duration field in a case where the RTS frame is not addressed to the terminal apparatus. On the other hand, in a case where the RTS frame is addressed to the terminal apparatus, when the SIFS has lapsed after the RTS frame has been received, the terminal apparatus that has transmitted the RTS frame uses a value of the duration field described in the RTS frame to estimate a time period during which the radio resource is occupied and transmits a CTS frame in which the value is written in the duration field.

While each apparatus performs carrier sense to autonomously acquire a transmission right in the DCF, a control station called a point coordinator (PC) controls a transmission right of each apparatus in the BSS in the PCF. The AP generally serves as the PC and acquires a transmission right of the STA in the BSS.

A communication period by the PCF includes a contention free period (CFP) and a contention period (CP). Communication is performed on the basis of the DCF described above during the CP and the PC controls the transmission right during the CFP. The AP serving as the PC broadcasts a beacon frame, in which a time period of the CFP (CFP Max duration) or the like is described, into the BSS before communication by the PCF. Note that, the PIFS is used to transmit the beacon frame that is broadcasted when transmission of the PCF starts and the beacon frame is transmitted without waiting for the CW. The STA having received the beacon frame sets the time period of the CFP described in the beacon frame to the NAV. After that, until the NAV has lapsed or a signal (for example, a data frame including CF-end) by which end of the CFP is broadcasted into the BSS is received, the STA is able to acquire the transmission right only when the STA receives a signal (for example, a data frame including CF-poll) that is transmitted by the PC and signals acquisition of the transmission right. Note that, since collision of packets in the same BSS does not occur during the time period of the CFP, each STA does not require the random back-off time used in the DCF.

The AP and the STA included in the communication system according to the present embodiment have the functions of performing a series of communication based on the CSMA/CA described above, but do not need to always have all the functions.

FIG. 1 is a schematic view illustrating an example of downlink of the communication system according to the first embodiment of the invention. In the communication system of FIG. 1, there is an AP 1 and a reference sign 1*a* denotes a range (coverage range, Basic service set (BSS)) that is able to be managed by the AP 1. In the BSS 1*a*, there are STAs 2-1 to 2-4 connected to the AP 1 and STAs 3-1 to 3-4 that are existing terminal apparatuses (conventional terminal apparatuses, legacy terminal apparatuses). Hereinafter, the STAs 2-1 to 2-4 are simply referred to also as STAs 2 or first radio receiving apparatuses. Similarly, the STAs 3-1 to 3-4 are simply referred to also as STAs 3 or second radio receiving apparatuses. Compatible standards of the AP 1, the STAs 2, and the STAs 3 are different from each other. For example, the AP 1 and the STAs 2 are apparatuses to which the invention is able to be applied and the STAs 3 are apparatuses to which the invention is not applied. Note that, the STAs 3 do not need to be always connected to the AP 1 and may be connected to another AP. Another BSS (Overlapping BSS: OBSS) using at least a part of frequencies used by the BSS 1*a* may exist around the BSS 1*a*.

The AP 1, the STAs 2, and the STAs 3 perform communication on the basis of the CSMA/CA. Though the present embodiment is intended for an infrastructure mode in which each of the STAs 2 and the STAs 3 performs communication with the AP 1, a method of the present embodiment may be carried out also in an ad hoc mode in which STAs directly perform communication with each other.

In the present embodiment, the AP 1 performs multi-user transmission in which packets to the STAs 2-1 to 2-4 are transmitted simultaneously to the respective STAs 2. Description will be given below by assuming that the multi-user transmission is orthogonal frequency division multiple access (OFDMA). Note that, the AP 1 may realize the multi-user transmission by space division multiple access (SDMA) using a plurality of space resources.

In the BSS 1*a*, it is assumed that at least four frequency channels (ch) are able to be used and each of them has a band of 20 MHz. It is assumed that the AP 1 performs the OFDMA transmission by using the four channels. Note that, the AP 1 is also able to perform the OFDMA transmission by further dividing a channel of 20 MHz into a plurality of sub-channels and regarding the sub-channels as a plurality of frequency channels. Note that, the number of channels or sub-channels used for the AP 1 to perform the OFDMA transmission is not limited to four and any number of channels may be used. The frequency channels used for the AP 1 to perform the OFDMA transmission do not need to be always consecutive.

Hereinafter, what the AP 1 causes each of the STAs 2 to participate in the OFDMA transmission indicates that the AP 1 is able to transmit a signal frame addressed to the STA 2 by the OFDMA transmission. What the STA 2 participates in the OFDMA transmission indicates that the STA 2 is able to receive the signal frame that is addressed to the STA 2 and transmitted from the AP 1 by the OFDMA transmission.

Figure 2:
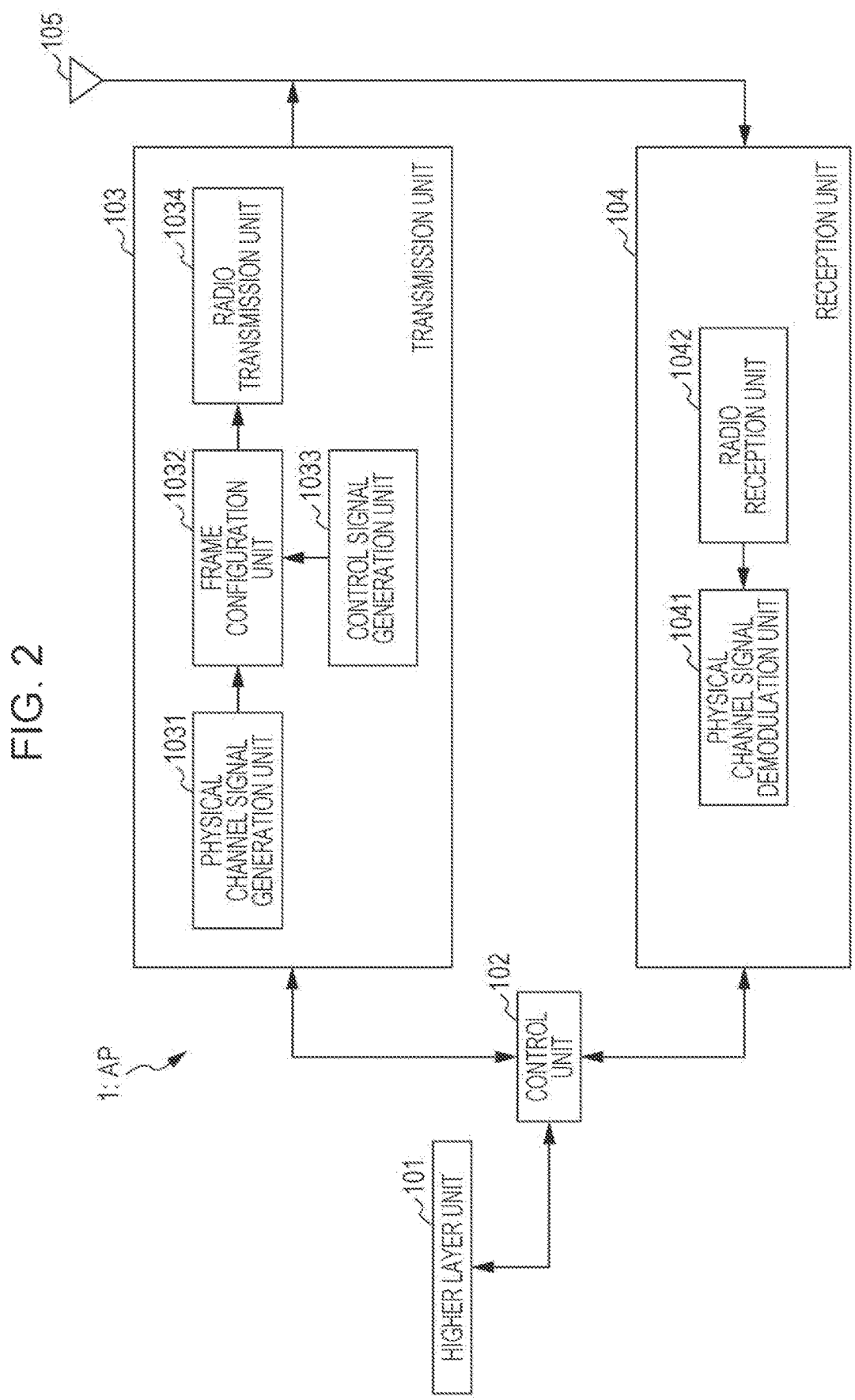
FIG. 2 is a schematic block diagram illustrating a configuration example of a radio transmission apparatus according to the invention.
Figure 3:
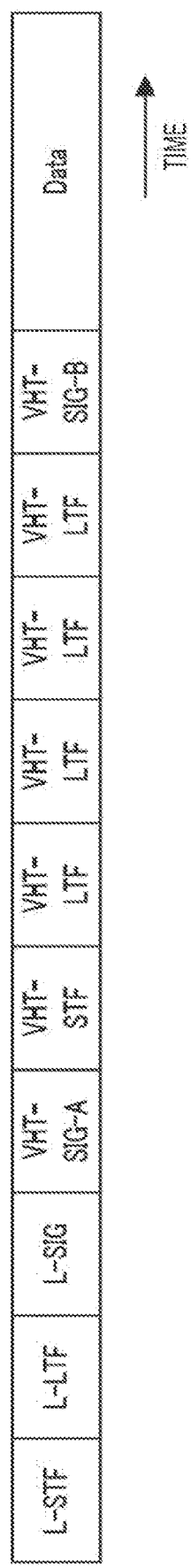
FIG. 3 illustrates a configuration example of a frame configuration of a signal of the invention.

FIG. 2 is a block diagram illustrating an example of a configuration of the AP 1 according to the first embodiment of the invention. As illustrated in FIG. 3, the AP 1 includes a higher layer unit 101, a control unit 102, a transmission unit 103, a reception unit 104, and an antenna 105.

The higher layer unit 101 performs processing in a medium access control (MAC) layer and the like. The higher layer unit 101 generates information for performing control of the transmission unit 103 and the reception unit 104 and outputs the information to the control unit 102. The control unit 102 controls the higher layer unit 101, the transmission unit 103, and the reception unit 104.

The transmission unit 103 further includes a physical channel signal generation unit 1031, a frame configuration unit 1032, a control signal generation unit 1033, and a radio transmission unit 1034. The physical channel signal generation unit 1031 generates baseband signals to be transmitted by the AP 1 to the STAs. The signals generated by the physical channel signal generation unit 1031 include TFs (Training fields) used by the STAs for channel estimation and data transmitted in an MSDU (MAC service data unit). Note that, an example in which the baseband signals to be transmitted to the STAs 2-1 to 2-4 and the STAs 3-1 to 3-4 are generated is indicated because the number of the STAs is eight in FIG. 1, but the present embodiment is not limited thereto.

The frame configuration unit 1032 multiplexes a signal generated by the physical channel signal generation unit 1031 and a signal generated by the control signal generation unit 1033, and configures a transmission frame of the baseband signal actually transmitted by the AP 1.

FIG. 3 is a schematic view illustrating an example of a physical layer of the transmission frame generated by the frame configuration unit 1032 according to the present embodiment. The transmission frame includes reference signals such as an L-STF, an L-LTF, a VHT-STF, and a VHT-LTF. The transmission frame also includes control information such as an L-SIG, a VHT-SIG-A, and a VHT-SIG-B. The transmission frame further includes a Data portion. The configuration of the transmission frame generated by the frame configuration unit 1032 is not limited to FIG. 3 and may include other control information (for example, an HT-SIG), reference signals (for example, an HT-LTF), and the like. The transmission frame generated by the frame configuration unit 1032 does not need to include all the signals such as the L-STF and the VHT-SIG-A. Note that, since information included in the L-SIG or the L-STF is information required for the AP 1 or each of the STAs 2 to demodulate the Data portion, a frame excluding the Data portion will be described below also as a physical layer header (PHY header).

The transmission frame generated by the frame configuration unit 1032 is classified into some frame types. For example, the frame configuration unit 1032 is able to generate transmission frames of three frame types of a management frame in which, for example, a connection state between apparatuses is managed, a control frame in which a communication state between apparatuses is managed, and a data frame including actual transmission data. The frame configuration unit 1032 is able to include information indicating a frame type to which the transmission frame to be generated belongs in a medium access control layer header (MAC header) transmitted in the data portion.

The radio transmission unit 1034 performs processing of converting the baseband signals generated by the frame configuration unit 1032 into radio frequency (RF) band signals. The processing performed by the radio transmission unit 1034 includes digital/analog conversion, filtering, frequency conversion from the baseband to the RF band, and the like.

The antenna 105 transmits signals generated by the transmission unit 103 to the STAs.

The AP 1 also has a function of receiving signals transmitted from the STAs. The antenna 105 receives the signals transmitted from the STAs and outputs the signals to the reception unit 104.

The reception unit 104 includes a physical channel signal demodulation unit 1041 and a radio reception unit 1042. The radio reception unit 1042 converts RF band signals input from the antenna 105 to baseband signals. The processing performed by the radio reception unit 1042 includes frequency conversion from the RF band to the baseband, filtering, analog/digital conversion, and the like. The processing performed by the reception unit 104 may include a function (carrier sense) of measuring peripheral interference in a specific frequency band to reserve the frequency band.

The physical channel signal demodulation unit 1041 demodulates the baseband signals output by the radio reception unit 1042. The signals demodulated by the physical channel signal demodulation unit 1041 are signals transmitted in uplink by the STAs 2 and the STAs 3, and have a frame configuration similar to that of the data frame generated by the frame configuration unit 1032. Thus, the physical channel signal demodulation unit 1041 is able to demodulate the uplink data by the data channel on the basis of control information transmitted by the control channel of the data frame. Further, the physical channel signal demodulation unit 1041 may include a carrier sense function. Note that, the reception unit 104 may input signal power in the frequency band to the higher layer unit 101 via the control unit 102 and the higher layer unit 101 may perform processing associated with carrier sense.

Figure 4:
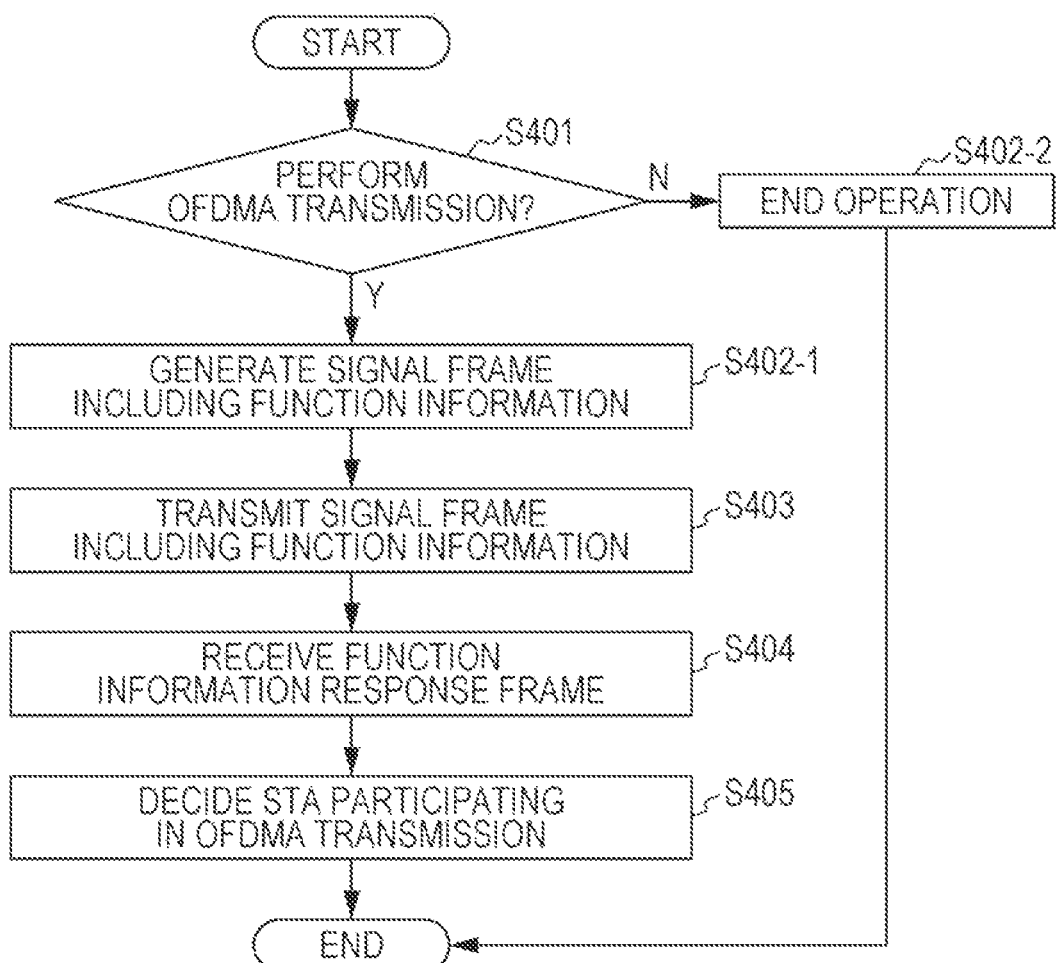
FIG. 4 is a flowchart illustrating an example of a communication method according to the invention.

FIG. 4 is a flowchart illustrating a flow of signal processing of the AP 1 according to the present embodiment. An operation of the AP 1 will be described below with reference to FIGS. 2 and 4.

Before starting OFDMA transmission, the AP 1 is able to notify (broadcast or signal), into the BSS 1a, function information (capability information) indicating that the AP 1 has a function of performing the OFDMA transmission. First, in accordance with the function of the AP 1, power consumption of the AP 1, an amount of traffic to each of the STAs belonging to the BSS 1a, which is accumulated in the AP 1, and the like, the higher layer unit 101 of the AP 1 determines whether or not the AP 1 performs the OFDMA transmission (step S401). When not performing the OFDMA transmission (step S401/N), the AP 1 does not perform an operation described below (step S402-2). Note that, the AP 1 may perform an operation based on conventional CSMA/CA subsequently to step S401/N.

When the AP 1 performs the OFDMA transmission (step S402-1), the transmission unit 103 then generates, in accordance with the determination of the higher layer unit 101, a signal frame for notifying, into the BSS 1a, function information (also referred to as first function information or OFDMA function information) indicating that the AP 1 has the function of performing the OFDMA transmission (step S402). Hereinafter, the signal frame including the function information is referred to as a function information frame (also referred to as a first function information frame or an OFDMA function information frame). For example, the transmission unit 103 is able to include, in a beacon frame, a one-bit function information field (also referred to as a first function information field or an OFDMA field) indicating the first function information. For example, when the AP 1 has the function of performing the OFDMA transmission, the transmission unit 103 may generate the beacon frame in which "1" is described in the OFDMA field of the beacon frame. On the other hand, when the AP 1 does not have the function of performing the OFDMA transmission or the AP 1 does not perform the OFDMA transmission, the transmission unit 103 may generate the beacon frame in which "0" is described in the OFDMA field of the beacon frame. Similarly, the transmission unit 103 is able to include the OFDMA field in another management frame (for example, a probe response frame).

The AP 1 is able to expect, of each of the STAs 2 in the BSS 1a, transmission of a function information response frame (details thereof will be described below) including function response information with respect to the signal frame including the function information transmitted by the AP 1. The transmission unit 103 is able to include, in the beacon frame, a response permitted period field indicating a period (response permitted period) during which a response to the OFDMA field is permitted. In the OFDMA transmission, the AP 1 is able to transmit a data signal only to the STA 2 that has transmitted the function information response frame received within the response permitted period. Such control makes it possible for the AP 1 to easily select the STA 2 that is caused to participate in the OFDMA transmission.

The transmission unit 103 is also able to describe the first function information in a signal frame other than the beacon frame and the management frame such as the probe response frame. For example, the transmission unit 103 is able to add the function information or the response permitted period to an existing control frame, such as a null data packet announcement (NDPA) frame, for transmission to the STA 2. The transmission unit 103 may describe an individual address, a plurality of individual addresses, or a group address of each of the STAs 2 in the signal frame in which the function information is described.

Next, the transmission unit 103 transmits, via the antenna 105, the signal frame including the function information (step S403). Note that, the transmission unit 103 is able to transmit the signal frame including the function information on the basis of the DCF.

Next, the reception unit 104 enters into a reception operation for receiving a function information response frame (also referred to as a first function information response frame or an OFDMA function information response frame) that is transmitted by each of the STAs 2 in the BSS 1a and includes the function response information (step S404). The reception unit 104 may always or periodically enter into the reception operation after the transmission unit 103 transmits the signal frame including the function information. When a response permitted period is included in the signal frame that is transmitted by the transmission unit 103 and includes the function information, the reception unit 104 may enter into the reception operation only during the response permitted period. The reception unit 104 notifies the higher layer unit 101 of information about the received function information response frame, and the higher layer unit 101 decides, on the basis of the information about the received function information response frame, the STA 2 that is caused to participate in the OFDMA transmission (step S405).

The function information response frame includes information indicating whether or not the STA 2 that has received the function information frame is capable of the OFDMA transmission. For example, the function information response frame has a one-bit function capability field (for example, an OFDMA capability field) indicating whether or not the STA 2 is capable of the OFDMA transmission. When "1" is described in the function capability field of the function information response frame, the AP 1 is able to cause the STA 2 that has transmitted the function information response frame to participate in the OFDMA transmission. On the other hand, when "0" is described in the function capability field of the function information response frame, the AP 1 does not cause the STA 2 that has transmitted the function information response frame to participate in the OFDMA transmission.

The function information response frame may also have a one-bit refuse field (for example, an OFDMA refuse field) indicating whether or not the STA 2 refuses the participation to the OFDMA transmission. When refusing the participation to the OFDMA transmission, the STA 2 is able to describe "1" in the refuse field and perform transmission to the AP 1. The AP 1 is able to perform control so that the STA 2 that has performed the transmission by describing "1" in the refuse field does not participate in the OFDMA transmission.

The function information response frame may also have a function incapability field (for example, an OFDMA incapability field) indicating that the STA 2 is incapable of the OFDMA transmission. When the STA 2 does not have a function for supporting the OFDMA transmission, the STA 2 is able to describe "1" in the function incapability field and perform transmission to the AP 1. The AP 1 is able to perform control so that the STA 2 that has performed the transmission by describing "1" in the function incapability field does not participate in the OFDMA transmission.

When the AP 1 transmits a beacon frame or a probe response frame with the function information included therein, the STA 2 is able to use a management frame associated with connection processing, such as an authentication frame, a connection request frame, or a reconnection request frame, as the function information response frame. For example, the STA 2 is able to include the function capability field in the connection request frame for transmission to the AP 1. The AP 1 reads a value of the function capability field of the connection request frame transmitted from the STA 2, and when "1" is described in the function capability field, the AP 1 is able to permit connection of the STA 2, and otherwise (that is, when "0" is described in the function capability field), the AP 1 is able to refuse connection of the STA 2.

The AP 1 is also able to transmit a resource reserving frame with the function information included therein. Here, the resource reserving frame is a signal frame transmitted by the AP 1 (or the STA 2) in order for the AP 1 (or the STA 2) to reserve a radio resource used for transmission of a predetermined signal frame before transmission of the predetermined signal frame. In this case, when the STA 2 that has received the resource reserving frame including the function information is capable of the OFDMA transmission, the STA 2 is able to transmit a resource reserving response frame, such as CTS, in response to the resource reserving frame. On the other hand, the STA 2 that is incapable of the OFDMA transmission or refuses reception of the signal frame transmitted by the OFDMA transmission may not transmit the resource reserving response frame in response to the resource reserving frame. The AP 1 is able to cause the STA 2 that has transmitted the resource reserving response frame in response to the resource reserving frame including the function information to participate in the OFDMA transmission.

Note that, the AP 1 is able to generate the resource reserving frame including the function information in accordance with a frame format of an RTS specified by the IEEE802.11 standard. For example, a field (for example, a receiver address field (RA)) in which information indicating the function information is described, and the information indicating the function information are able to be shared in advance between the AP 1 and the STA 2. For example, when an address of the AP 1 is described in an RA of an RTS frame, the AP 1 is able to use the RTS frame as a frame indicating the function information.

Figure 5:
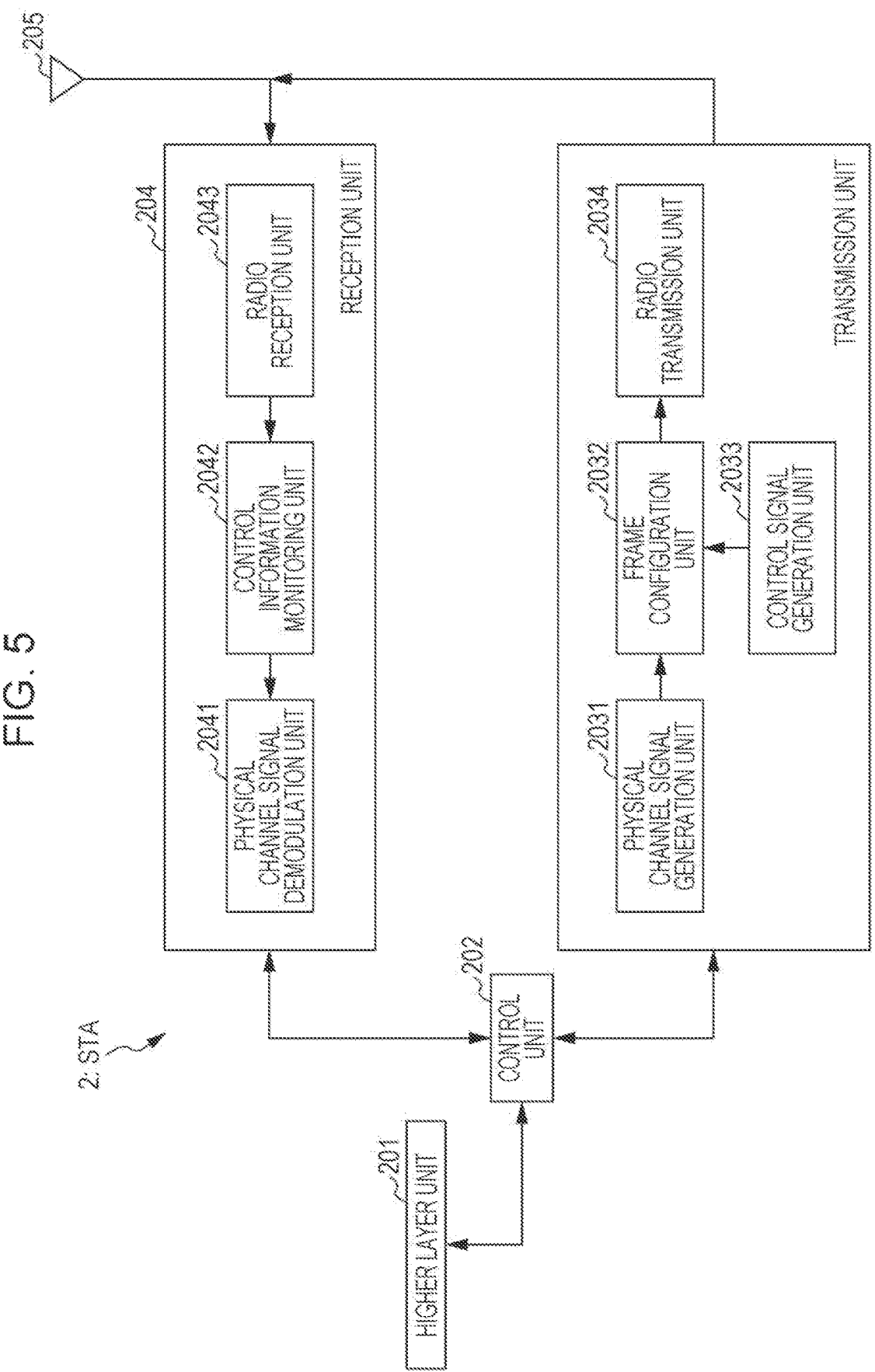
FIG. 5 is a schematic block diagram illustrating a configuration example of a radio receiving apparatus according to the invention.

FIG. 5 is a block diagram illustrating a configuration example of the STA 2 according to the present embodiment. As illustrated in FIG. 5, the STA 2 includes a higher layer unit 201, a control unit 202, a transmission unit 203, a reception unit 204, and an antenna 205.

The higher layer unit 201 performs processing of a MAC layer and the like. The higher layer unit 201 generates information for performing control of the transmission unit 203 and the reception unit 204 and outputs the information to the control unit 202.

The antenna 205 receives a signal transmitted by the AP 1 and outputs the signal to the reception unit 204.

The reception unit 204 includes a physical channel signal demodulation unit 2041, a control information monitoring unit 2042, and a radio reception unit 2043. The radio reception unit 2043 converts an RF band signal input from the antenna 205 into a baseband signal. The processing performed by the radio reception unit 2043 includes frequency conversion from the RF band to the baseband, filtering, analog/digital conversion, and the like.

The control information monitoring unit 2042 reads information described in a PHY header (for example, an L-SIG or a VHT-SIG-A) of a transmission frame transmitted by the AP 1 from the baseband signal output by the radio reception unit 2043 and inputs the information to the physical channel signal demodulation unit 2041.

On the basis of the control information acquired by the control information monitoring unit 2042, the physical channel signal demodulation unit 2041 demodulates the transmission frame transmitted by the AP 1, and inputs a demodulation result to the higher layer unit 201 via the control unit 202.

The higher layer unit 201 interprets data, which is demodulated by the physical channel signal demodulation unit 2041, in a MAC layer, an LLC (Logical Link Control) layer, and a transport layer. As processing in the MAC layer of the higher layer unit 201, various information is able to be acquired from the transmission frame transmitted by the AP 1. For example, when the higher layer unit 201 interprets the transmission frame transmitted by the AP 1 as a beacon frame, it is possible to acquire, for example, information indicating a function (capability) of the AP 1 described in the beacon frame.

The processing performed by the reception unit 204 may include a function (carrier sense) of measuring peripheral interference in a specific frequency band to reserve the frequency band.

The STA 2 also has a function of transmitting a signal. The antenna 205 transmits an RF band signal generated by the transmission unit 203 to the AP 1.

The transmission unit 203 includes a physical channel signal generation unit 2031, a control signal generation unit 2033, a frame configuration unit 2032, and a radio transmission unit 2034. The physical channel signal generation unit 2031 generates a baseband signal to be transmitted by the STA 2 to the AP 1. The control signal generation unit 2033 generates a control signal used for the AP 1 to demodulate the signal generated by the physical channel signal generation unit 2031. The frame configuration unit 2032 generates a signal frame, for example, as illustrated in FIG. 9 on the basis of the signals generated by the physical channel signal generation unit 2031 and the control signal generation unit 2032.

The radio transmission unit 2034 converts the baseband signal generated by the frame configuration unit 2032 into an RF band signal. The processing performed by the radio transmission unit 2034 includes digital/analog conversion, filtering, frequency conversion from the baseband to the RF band, and the like.

Figure 6:
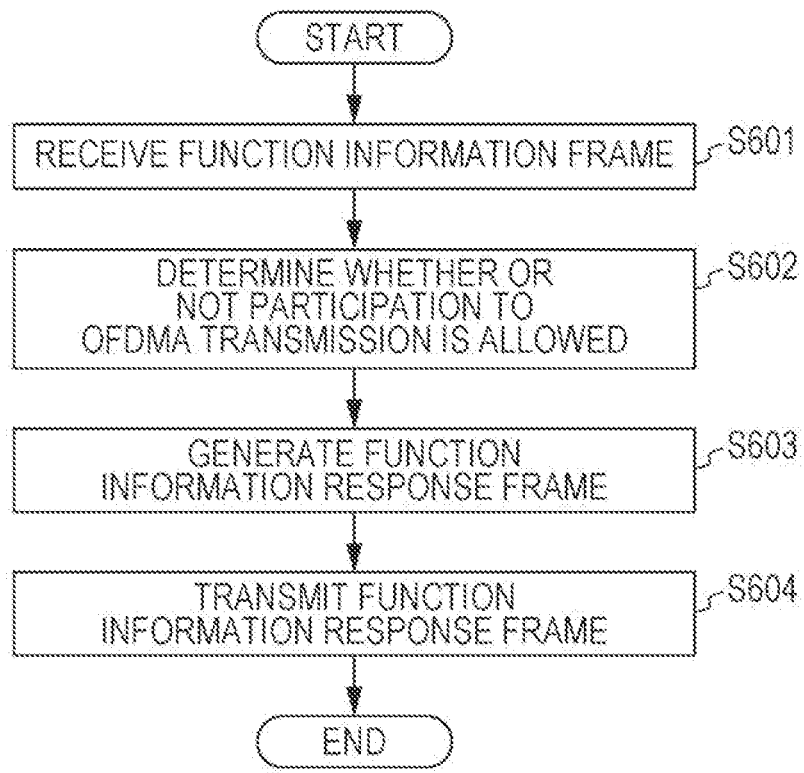
FIG. 6 is a flowchart illustrating an example of a communication method according to the invention.

FIG. 6 is a flowchart for explaining an example of signal processing of the STA 2 according to the present embodiment. An operation of the STA 2 will be described below with reference to FIGS. 5 and 6.

First, the reception unit 204 receives a function information frame transmitted by the AP 1 and notifies the higher layer unit 201 of a demodulation result thereof (step S601).

The higher layer unit 201 reads content of the description (for example, information of a function information field) in the function information frame, and determines whether or not the AP 1 has a function of performing OFDMA transmission and determines whether or not the STA 2 has a function of participating in the OFDMA transmission (step S602). The higher layer unit 201 then generates function response information indicating whether or not the STA 2 has the function of participating in the OFDMA transmission.

Next, on the basis of the determination by the higher layer unit 201 at step S602, the transmission unit 203 generates a function information response frame including the function response information (step S603). When the higher layer unit 201 determines that the STA 2 does not have the function of participating in the OFDMA transmission, the reception unit 204 is able to describe, in a function capability field of the function information response frame, information indicating that STA 2 does not have the function of participating in the OFDMA transmission as the function response information. On the other hand, when the higher layer unit 201 determines that the STA 2 has the function of participating in the OFDMA transmission, the reception unit 204 is able to describe, in the function capability field of the function information response frame, information indicating that the STA 2 has the function of participating in the OFDMA transmission. Note that, even when the function information frame transmitted by the AP 1 is not received, the STA 2 may transmit the function information response frame including the function capability field to the AP 1.

Then, the transmission unit 203 transmits the generated function information response frame (step S604). Note that, the transmission unit 203 is able to transmit the generated function information response frame on the basis of the DCF.

Since the STA 2 is able to describe the function capability field in a management frame such as a connection request frame, the STA 2 is able to decide the AP 1 to be connected, on the basis of description in a function information field of a beacon frame transmitted by the AP 1. For example, when the STA 2 does not have the function of participating in the OFDMA transmission or refuses the participation to the OFDMA transmission, the STA 2 is able to refuse connection (or authentication) to the AP 1 that transmits the beacon frame (or probe response frame) including the function information field indicating that the function of performing the OFDMA transmission is included. The STA 2 is also able to transmit a signal frame other than the management frame with the function capability field included therein.

The STA 2 is able to include, in the function information response frame, information indicating whether or not the STA 2 is capable of the OFDMA transmission. For example, the STA 2 is able to include, in the function information response frame, a one-bit function capability field (for example, an OFDMA capability field) indicating whether or not the STA 2 is capable of the OFDMA transmission. When the STA 2 is able to participate in the OFDMA transmission, the STA 2 is able to describe "1" in the function capability field in order to indicate that the STA 2 is able to participate in the OFDMA transmission. On the other hand, when the STA 2 does not have the function of participating in the OFDMA transmission or refuses the participation to the OFDMA transmission, the STA 2 is able to describe "0" in the function capability field in order to indicate that the STA 2 does not have the function of participating in the OFDMA transmission or refuses the participation to the OFDMA transmission.

The STA 2 is also able to include, in the function information response frame, a one-bit refuse field (for example, an OFDMA refuse field) indicating whether or not the STA 2 refuses the participation to the OFDMA transmission. When the STA 2 refuses the participation to the OFDMA transmission, the STA 2 is able to describe "1" in the refuse field and perform transmission to the AP 1. On the other hand, when the STA 2 does not refuse the participation to the OFDMA transmission, the STA 2 is able to describe "0" in the refuse field and perform transmission to the AP 1.

The STA 2 is also able to include, in the function information response frame, a function incapability field (for example, an OFDMA incapability field) indicating that the STA 2 is incapable of the OFDMA transmission. When the STA 2 does not have the function for supporting the OFDMA transmission, the STA 2 is able to describe "1" in the function incapability field and perform transmission to the AP 1. On the other hand, when the STA 2 has the function for supporting the OFDMA transmission, the STA 2 is able to describe "0" in the function incapability field and perform transmission to the AP 1.

According to the communication system including the AP 1 and the STAs 2 described above, the OFDMA transmission is realized while suppressing overhead, thus making it possible to contribute to improvement of frequency efficiency of the communication system.

2. Second Embodiment

The AP 1 and the STAs 2 according to the second embodiment provide a communication system in which, prior to OFDMA transmission, a radio resource (for example, a frequency channel) between the AP 1 and each of the STAs 2 is able to be highly efficiently reserved.

The AP 1 and the STAs 2 according to the present embodiment are configured similarly to those of the first embodiment.

The AP 1 according to the present embodiment has a function of transmitting, into the BSS 1a, a resource reserving frame for reserving a radio resource between the AP 1 and each of the STAs 2. Note that, similarly to the AP 1 according to the first embodiment, the AP 1 according to the present embodiment is able to transmit a function information frame to the STAs 2 before the OFDMA transmission. Though the AP 1 is able to decide, on the basis of function information response frames transmitted from the STAs 2, the STA 2 that is caused to participate in the OFDMA transmission, the AP 1 and the STAs 2 according to the present embodiment may not necessarily exchange the function information frame and the function information response frame.

The AP 1 is able to transmit an RTS frame into the BSS 1a as a resource reserving frame. Note that, though the AP 1 describes an individual address in an RA of an RTS frame of the existing IEEE802.11 standard, the AP 1 according to the present embodiment describes, in an RA, a group address or information that is decided in advance between the AP 1 and the STAs 2 and is thus able to transmit resource reserving signals to a plurality of STAs 2 in the BSS 1a that may be caused to participate in the OFDMA transmission. In the following description, it is assumed that the AP 1 transmits resource reserving frames in all radio resources that may be used for the OFDMA transmission. Here, the radio resource is defined by a frequency (or a frequency channel), a time, a space, a code, and the like. For example, the AP 1 is able to transmit each of the resource reserving frames to a frequency channel for each 20 MHz, which is used for the OFDMA transmission.

When each of the STAs 2 that has received the resource reserving frame transmitted from the AP 1 interprets the resource reserving frame as a resource reserving frame to the STA 2, the STA 2 is able to transmit a resource reserving response frame to the AP 1. At this time, the STA 2 is able to transmit the resource reserving response frame to a radio resource in which the STA 2 does not receive an interference signal, that is, a radio resource that is able to be interpreted as being in an idle state. The STA 2 may transmit the resource reserving response frame to all radio resources that are able to be interpreted as being in the idle state or may transmit the resource reserving response frame only to a part of radio resources.

In this case, the AP 1 according to the present embodiment transmits a resource reserving frame to a plurality of STAs 2 in the BSS 1a at the same time. Thus, when the STAs 2 that have received the resource reserving frame transmit resource reserving response frames at the same time, the AP 1 is able to understand that a radio resource in which the resource reserving response frames are received is able to be reserved at least in a part of the BSS 1a. However, the AP 1 is not able to determine in which range in the BSS 1a the radio resource is able to be reserved. Here, considered is a case where each of the STAs 2 transmits the resource reserving response frame with specific information included therein. With such control, while the AP 1 is able to interpret which STA 2 has transmitted the resource reserving response frame, each of the STAs 3 serving as the legacy terminal apparatus is not able to interpret the resource reserving response frame as the resource reserving response frame even when having received the resource reserving response frame. Thus, the STA 2 according to the present embodiment generates the resource reserving response frame so that the STA 3 serving as the legacy terminal apparatus is able to recognize it as the resource reserving response frame and the AP 1 is able to interpret which STA 2 has transmitted the resource reserving response frame.

Figure 7:
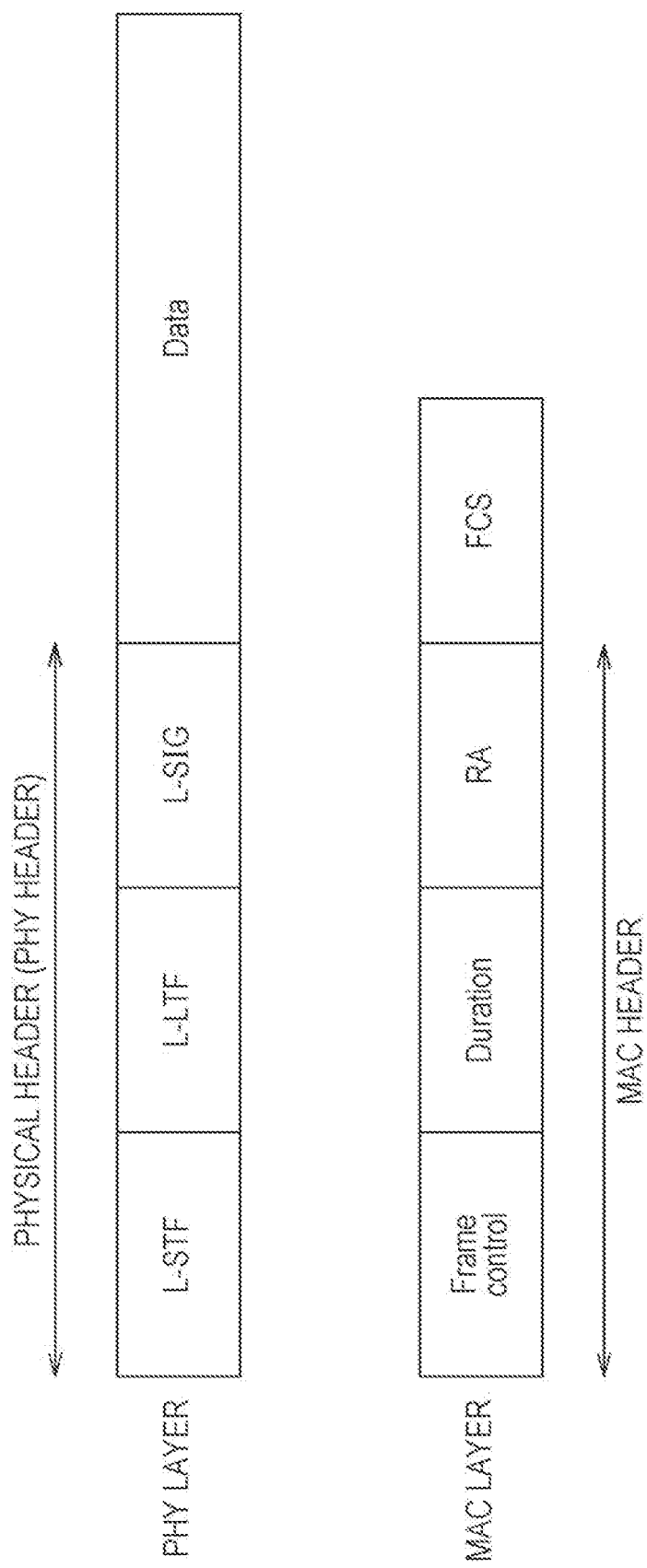
FIG. 7 illustrates a configuration example of a frame configuration of a signal of the invention.

FIG. 7 is a schematic view illustrating an example of a frame format of a resource reserving response frame transmitted by the STA 2 according to the present embodiment. Here, for simplification of the description, it is assumed that the STA 2-1 and the STA 2-2 in the BSS 1a transmit resource reserving response frames by the same radio resource, but the present embodiment is not limited to such an example. For example, there may be three or more STAs 2 or the STAs 2 may transmit resource reserving response frames by a plurality of radio resources.

The transmission unit 203 of the STA 2 according to the present embodiment generates a resource reserving response frame common with that of another STA 2. Here, the resource reserving response frame according to the present embodiment includes a PHY header, such as a synchronization signal (for example, L-STF), a reference signal (for example, L-LTF), and a control signal (for example, L-SIG) that is used for the AP 1 to demodulate the resource reserving response frame and a data portion (for example, Data) indicating content of the resource reserving response frame. The Data includes, for example, a MAC header that is able to be interpreted by the higher layer unit 101 of the AP 1 in a MAC layer. In order for the STA 3 serving as the legacy terminal apparatus to recognize the frame as the resource reserving response frame, the transmission unit 203 of the STA 2 is able to generate, as the resource reserving response frame, a CTS frame specified by the existing IEEE802.11 standard. When the STA 2 transmits the resource reserving response frame at the same time with another STA 2, the STA 3 serving as the legacy terminal apparatus and the AP 1 are not able to determine which STA 2 has transmitted the resource reserving response frame as described above. For example, in the case of FIG. 7 as an example, the AP 1 is not able to determine whether one of the STA 2-1 and the STA 2-2 has transmitted the resource reserving response frame or both of the STA 2-1 and the STA 2-2 have transmitted the resource reserving response frame.

Thus, the transmission unit 203 of each of the STAs 2 according to the present embodiment gives a cyclic shift to the generated resource reserving response frame. FIG. 8 illustrates an example of a method of generating the resource reserving response frame according to the present embodiment. Here, for simplification of the description, it is assumed that the resource reserving response frame is constituted by L-LTF and Data each of which is composed of one OFDM symbol and the number of OFDM samples constituting the OFDM symbol is four, and a guard interval (cyclic prefix) is constituted by two samples. Of course, the resource reserving response frame may include another element (for example, L-STF) and the number of OFDM symbols constituting the L-STF or the like and the number of samples constituting the OFDM symbol or the guard interval are not limited thereto.

As describing FIG. 8 as an example, the transmission unit 203 of the STA 2-1 does not give the cyclic shift to the resource reserving response frame. In other words, the transmission unit 203 of the STA 2-1 gives the cyclic shift of zero sample to the resource reserving response frame. The transmission unit 203 of the STA 2-2 gives the cyclic shift of two samples to the resource reserving response frame.

The transmission unit 203 of each of the STAs 2 is able to decide, in the STA 2, a cyclic shift amount given to the resource reserving response frame. For example, the STA 2 is able to decide the cyclic shift amount on the basis of the AID assigned to the STA 2 by the AP 1. In this case, by applying some kind of calculation to the AID (for example, the STA 2 is able to perform reminder by summing up the assigned AID and dividing a result of the sum by the number of OFDM samples), the STA is able to decide the cyclic shift amount. Thus, the AP 1 is also able to decide the AID by assuming the cyclic shift amount decided by the STA 2.

The AP 1 is able to explicitly perform signaling of the cyclic shift amount to the STAs 2. For example, the AP 1 is able to describe the cyclic shift amount in a connection response frame or an authentication frame with respect to a connection request from each of the STAs 2 and perform transmission to the STA 2.

The AP 1 is also able to implicitly perform signaling of the cyclic shift amount to the STAs 2. For example, the AP 1 is able to describe a group ID in the resource reserving frame. Each of the STAs 2 is able to judge the cyclic shift amount on the basis of an ordinal position at which an address of the STA 2 is described in a group specified by the group ID. For example, a specific integral value is able to be decided between the AP 1 and each of the STAs 2, so that the STA 2 is able to decide the cyclic shift amount by multiplying the integral value by the order at which an address of the STA 2 is described in the group specified by the group ID.

The STA 2 may change, for each radio resource, a phase rotation amount of phase rotation applied to the resource reserving frame. For example, considered is a case where the STA 2-1 and the STA 2-2 transmit resource reserving response frames to a predetermined radio resource (also referred to as a first radio resource) by using the cyclic shift amount as illustrated in FIG. 8. At this time, with respect to a resource reserving response frame transmitted from a radio resource (also referred to as a second radio resource) different from the predetermined radio resource, the STA 2-2 is able to transmit the resource reserving response frame without giving the cyclic shift and the STA 2-1 is able to transmit the resource reserving response frame by giving the cyclic shift.

The reception unit 104 of the AP 1 receives the resource reserving response frames transmitted from the STA 2-1 and the STA 2-2 and then applies Discrete Fourier Transform (DFT) (or Fast Fourier Transform: FFT) to OFDM symbols constituting the resource reserving response frames and performs sub-carrier demodulation. In order to demodulate the data portion, channel estimation is performed by using the L-LTF.

A method of the channel estimation performed by the reception unit 104 is not limited, and reverse modulation based on a reference signal sequence used for the L-LTF may be performed, for example. A conventional AP 1 performs demodulation for the data portion on the basis of a channel estimation value obtained through the reverse modulation. The reception unit 104 of the AP 1 according to the present embodiment further applies Inverse Discrete Fourier Transform (IDFT) (or Inverse Fast Fourier Transform: IFFT) to the channel estimation value.

FIG. 9 is a schematic view illustrating an example of a state of an Inverse Discrete Fourier Transform output applied to a channel estimation value by the reception unit 104 according to the present embodiment. Since a frequency transfer function (actually, an estimation value of the frequency transfer function) of a channel between the AP 1 and the STA 2 is obtained when the reception unit 104 applies reverse modulation to the L-LTF, the Discrete Fourier Transform output with respect to a result of the reverse modulation by the reception unit 104 is an instantaneous impulse response (actually, an estimation value of the instantaneous impulse response of the channel) of the channel between the AP 1 and the STA 2. Hereinafter, for simplification of the description, it is assumed that the channel between the AP 1 and the STA 2 is a two-path channel model and delay time between paths is one sample. Here, time of one sample is a sampling period of the DFT or the IDFT. Note that, in the present embodiment, it is assumed that a value obtained by applying the IDFT (or the IFFT) to the frequency transfer function of the channel between the AP 1 and the STA 2 is an instantaneous impulse response (or simply a channel impulse response) of the channel.

Since the STA 2-1 does not give the cyclic shift to the L-LTF, the instantaneous impulse response of the channel between the AP 1 and the STA 2-1 is output at the zeroth sample and the first sample of the IDFT output of the reception unit 104. On the other hand, since the STA 2-2 gives the cyclic shift of two samples to the L-LTF, the instantaneous impulse response of the channel between the AP 1 and the STA 2-2 is output at the second sample and the third sample of the IDFT output of the reception unit 104. Thus, by grasping in advance the cyclic shift amount applied to the resource reserving response frame by each of the STAs 2, the AP 1 is able to grasp which STA 2 has transmitted the resource reserving response frame on the basis of the IDFT output of the reception unit 104.

As describing FIG. 9 as an example, when the instantaneous impulse response is observed at the zeroth sample and the first sample of the IDFT output of the reception unit 104, the AP 1 is able to understand that the STA 2-1 has transmitted the resource reserving response frame. When the instantaneous impulse response is observed at the second sample and the third sample of the IDFT output of the reception unit 104, the AP 1 is able to understand that the STA 2-2 has transmitted the resource reserving response frame. When the STAs 2 generate the same resource reserving response frames and apply different cyclic shifts to the resource reserving response frames as described above, the AP 1 is able to grasp which STA 2 has transmitted the resource reserving response frame.

Note that, the reception unit 104 of the AP 1 is not always required to apply IDFT processing to the resource reserving response frame to which the cyclic shift is given. When each of the STAs 2 applies the cyclic shift to a predetermined resource reserving response frame, a frequency response (that is, a DFT output with respect to the resource reserving response frame) of the resource reserving response frame is obtained by applying phase rotation corresponding to the cyclic shift to a frequency response of the resource reserving response frame to which the cyclic shift is not given. For example, when a DFT output of an OFDM signal included in the resource reserving response frame to which the cyclic shift is not given is $\{S(k); k=0 \text{ to } (N_c-1)\}$ ($N_c$ is a DFT point number), a DFT output of an OFDM signal included in the resource reserving response frame to which the cyclic shift of an M sample is given is $\{S(k)\exp(j2\pi Mk/N_c); k=0 \text{ to } (N_c-1)\}$. Thus, by calculating a correlation between the DFT output of the resource reserving response frame transmitted by each of the STAs 2 and the DFT output of the OFDM signal included in the resource reserving response frame to which phase rotation is applied by the cyclic shift amount that is defined in advance between the AP 1 and each of the STAs 2, the reception portion 104 of the AP 1 is able to determine which STA 2 has transmitted the resource reserving response frame. For example, in a case where the reception portion 104 calculates a correlation between a DFT output of an OFDM signal included in the resource reserving response frame to which a cyclic shift of an M sample is given and a DFT output of an OFDM signal included in a received resource reserving response frame, when a correlation output value thus obtained is greater than a predetermined value (threshold), the reception unit 104 is able to determine that the STA 2 that gives the cyclic shift of the M sample to the resource reserving response frame has transmitted the received resource reserving response frame.

Note that, the cyclic shift amount given by each of the STAs 2 to a resource reserving response frame is not limited. For example, the STA 2 (or the AP 1) may use a random integer from 1 to N as the cyclic shift amount with the number N of samples of an OFDM signal included in the resource reserving response frame as an upper limit. The STA 2 (or the AP 1) may use a random integer from 1 to $N_g$ as the cyclic shift amount with the number $N_g$ of samples of a guard interval (or a cyclic prefix) of an OFDM signal included in the resource reserving response frame as an upper limit.

Note that, description has been given by taking a case where the AP 1 transmits a signal frame to a plurality of STAs 2 by OFDMA transmission as an example. A method according to the present embodiment is also applicable to a case where a plurality of STAs 2 transmit signal frames to the AP 1 by OFDMA transmission. In this case, as described above, it is possible that the AP 1 transmits a resource reserving frame to the plurality of STAs 2 and the STAs 2 transmit resource reserving response frames corresponding to the resource reserving frame at the same time. It is also possible that the plurality of STAs 2 apply the specific cyclic shift to predetermined resource reserving frames and then transmit the resource reserving frames at the same time. With the method described above, the AP 1 having received the resource reserving frames is able to discriminate the STAs 2 that have transmitted the resource reserving frames. Thus, when the AP 1 receives the resource reserving frames and determines that a radio resource in which the resource reserving frames have been transmitted is in an idle state, the AP 1 is able to transmit a common resource reserving response frame by using the radio resource that is determined to be in the idle state. The AP 1 may transmit an individual resource reserving response frame to the STAs 2 to which the radio resource that is determined to be in the idle state is assigned.

According to the AP 1 and the plurality of STAs 2 described above, the plurality of STAs 2 are able to transmit resource reserving response frames at the same time. The STA 3 serving as the legacy terminal apparatus is able to correctly receive the resource reserving response frames transmitted by the plurality of STAs 2 at the same time. By grasping in advance a cyclic shift amount applied to the resource reserving response frames by the STAs 2, the AP 1 is able to correctly determine which STAs 2 have transmitted the resource reserving response frames. Thus, according to the AP 1 and the STAs 2, the AP 1 is able to efficiently reserve a radio resource used for OFDMA transmission while suppressing overhead associated with transmission of a resource reserving frame and a resource reserving response frame, and further, the AP 1 is able to correctly discriminate the STA 2 that has transmitted the resource reserving response frame, resulting in improvement of user throughput of the STAs 2.

3. Common in All Embodiments

Note that, a program which runs in the AP 1, the STAs 2, and the STAs 3 according to the invention is a program that controls a CPU and the like (program that causes a computer to function) such that the functions in the aforementioned embodiments concerning the invention are realized. The pieces of information handled by the apparatuses are temporarily accumulated in a RAM during the processing thereof, and then stored in various ROMs and HDDs and read, corrected, and written by the CPU when necessary. A recording medium that stores the program therein may be any of a semiconductor medium (for example, a ROM, a nonvolatile memory card or the like), an optical recording medium (for example, a DVD, an MO, an MD, a CD, a BD or the like), a magnetic recording medium (for example, a magnetic tape, a flexible disc or the like), and the like. Moreover, there is also a case where, by executing the loaded program, not only the functions of the aforementioned embodiments are realized, but also by performing processing in cooperation with an operating system, other application programs or the like on the basis of an instruction of the program, the functions of the invention may be realized.

When being distributed in the market, the program is able to be stored in a portable recording medium and distributed or be transferred to a server computer connected through a network such as the Internet. In this case, a storage apparatus of the server computer is also included in the invention. A part or all of the AP 1, the STAs 2, and the STAs 3 in the aforementioned embodiments may be realized as an LSI which is a typical integrated circuit. Each functional block of the AP 1, the STAs 2, and the STAs 3 may be individually formed into a chip, or a part or all thereof may be integrated and formed into a chip. When each functional block is made into an integrated circuit, an integrated circuit control unit for controlling them is added.

Further, a method for making into an integrated circuit is not limited to the LSI and a dedicated circuit or a versatile processor may be used for realization. Further, in a case where a technique for making into an integrated circuit in place of the LSI appears with advance of a semiconductor technique, an integrated circuit by the technique is also able to be used.

Note that, the invention of the present application is not limited to the aforementioned embodiments. The AP 1, the STAs 2, and the STAs 3 of the present application are not limited to be applied to a mobile station apparatus, but, needless to say, are applicable to stationary or unmovable electronic equipment which is installed indoors or outdoors such as, for example, AV equipment, kitchen equipment, cleaning/washing machine, air conditioning equipment, office equipment, automatic vending machine, other domestic equipment, and the like.

As above, the embodiments of the invention have been described in detail with reference to drawings, but specific configurations are not limited to the embodiments, and a design and the like which are not departed from the main subject of the invention are also included in the scope of claims.

INDUSTRIAL APPLICABILITY

The invention is suitably used for a radio transmission apparatus, a radio receiving apparatus, a communication system, and a communication method.

Note that, the present international application claims priority from Japanese Patent Application No. 2015-047811 filed on Mar. 11, 2015, and the entire contents of Japanese Patent Application No. 2015-047811 are hereby incorporated herein by reference.

REFERENCE SIGNS LIST

1 AP
2, 2-1, 2-2, 2-3, 2-4, 3, 3-1, 3-2, 3-3, 3-4 STA
101, 201 higher layer unit
102, 202 control unit
103, 203 transmission unit
104, 204 reception unit
105, 205 antenna
1031, 2031 physical channel signal generation unit
1032, 2032 frame configuration unit
1033, 2033 control signal generation unit
1034, 2034 radio transmission unit
1041, 2041 physical channel signal demodulation unit
1042, 2043 radio reception unit
2042 control information monitoring unit

The invention claimed is:

1. A radio receiving apparatus performing communication with a radio transmission apparatus that performs multi-user transmission with a plurality of radio receiving apparatuses, the radio receiving apparatus comprising:

a transmission circuit that transmits a frame including a refuse field associated with the multi-user transmission, wherein when refusing participating in the multi-user transmission, "1" is set in the refuse field, and when not refusing participating in the multi-user transmission, "0" is set in the refuse field; and a reception circuit that acquires information indicating whether or not the radio transmission apparatus enables receiving of information of the refuse field, from a beacon frame transmitted by the radio transmission apparatus, wherein the frame including the refuse field includes a training field.

2. A radio transmission apparatus that performs multi-user transmission with a plurality of radio receiving apparatuses, the radio transmission apparatus comprising:

a reception circuit that receives a frame including a refuse field associated with the multi-user transmission from a radio receiving apparatus of the plurality of radio receiving apparatuses; and a transmission circuit that transmits a beacon frame including information indicating whether or not the radio transmission apparatus enables accepting of information of the refuse field, wherein the frame including the refuse field includes a training field, when the radio receiving apparatus refuses participating in the multi-user transmission, "1" is set in the refuse field, and when the radio receiving apparatus does not refuse participating in the multi-user transmission, "0" is set in the refuse field.

3. A communication method of a radio receiving apparatus performing communication with a radio transmission apparatus that performs multi-user transmission with a plurality of radio receiving apparatuses, the method comprising:

transmitting a frame including a refuse field associated with the multi-user transmission, wherein when refusing participating in the multi-user transmission, "1" is set in the refuse field, and when not refusing participating in the multi-user transmission, "0" is set in the refuse field; and acquiring information indicating whether or not the radio transmission apparatus enables receiving of information of the refuse field, from a beacon frame transmitted by the radio transmission apparatus, wherein the frame including the refuse field includes a training field.

* * * * *